United States Patent [19]

Stubblefield

[11] 3,831,345
[45] Aug. 27, 1974

[54] ANIMAL BRIDLE
[76] Inventor: Maurice Stubblefield, Clancy, Mont. 59634
[22] Filed: Apr. 3, 1973
[21] Appl. No.: 347,386

[52] U.S. Cl. .......................................... 54/6, 54/8
[51] Int. Cl. ........................... B68b 1/04, B68b 1/06
[58] Field of Search ............................ 54/6, 7, 8, 9

[56] References Cited
UNITED STATES PATENTS
612,440    10/1898    Shepard ............................... 54/8 X
2,342,449  2/1944     Burgess ................................ 54/6 R
2,347,752  5/1944     Schmelz ............................... 54/6 R Primary Examiner—Hugh R. Chamblee
Attorney, Agent, or Firm—Baldwin, Wight & Brown

[57] ABSTRACT

This disclosure relates to an animal bridle which includes a nose and chin strap attached to cheek pieces and adapted to be wrapped at least once entirely about the animal's nose and chin whereby the strap will tighten equally when the bridle is rotated by reining in, the bridle being composed of a pair of spaced cheek pieces joined intermediate opposite ends thereof by a bit, a bar carried by the bit and a mouth roof engaging plate carried by the bar which is preferably pivotally mounted thereupon to provide positive action when in use.

5 Claims, 6 Drawing Figures

PATENTED AUG 27 1974

3,831,345

ANIMAL BRIDLE

A primary object of this invention is to provide a novel reining and handling bridle which insures speed of response between rider and animal, is readily and inexpensively manufactured, and capable of rapid application to and removable from the animal's mouth and lower head area.

With the above and other objects in view that will hereinafter appear, the nature of the invention will be more clearly understood by reference to the following detailed description, the appended claimed subject matter, and the several views illustrated in the accompanying drawing.

Figure 2:
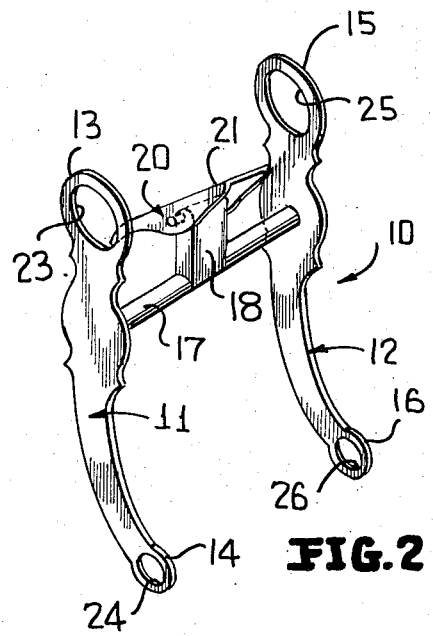
FIG. 2 is a perspectivew view of the bridle, and illustrates details of a pair of cheek pieces joined intermediate opposite ends thereof by a bit which in turn carries a bar to which is pivotally mounted a plate which engages against the roof of the animal's mouth, as shown in FIGS. 1 and 3.
Figure 3:
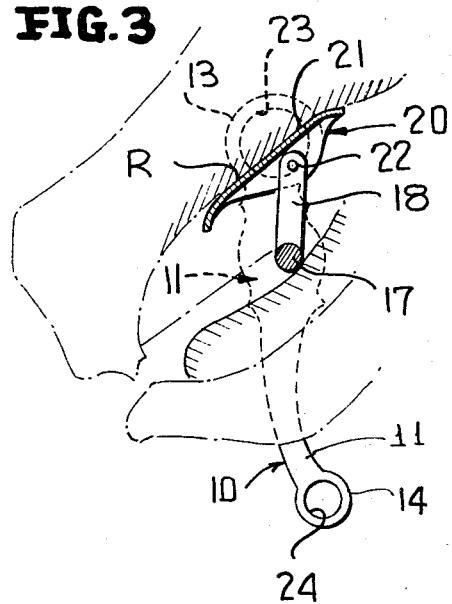
FIG. 3 is a cross-sectional view taken normally through the bit, and illustrates the manner in which the plate engages the mouth roof with a mouth roof engaging surface thereof passing generally through a coincident axis of openings in the cheek pieces to which it is attached a lower head encircling strap.

A novel bridle or halter constructed in accordance with this invention is generally designated by the reference numeral 10 (FIG. 2) and is defined by a pair of spaced cheek pieces 11, 12 joined intermediate opposite ends 13, 14 and 15, 16, respectively, by a generally cylindrical bit 17. A bar 18 is welded, integrally formed with, or otherwise carried by the bit 17 and is positioned generally midway between the cheek pieces 11, 12. A plate 20 having a roof engaging surface 21 (FIG. 3) is pivotally carried by the terminal end (unnumbered) of the bar 18 by a conventional pivot pin 22.

Openings 23, 24 are formed in the respective ends 13, 14 of the cheek piece 11 while similar openings 25, 26 are formed in the respective ends 15, 16 of the cheek piece 12. The openings 23, 25 have a coincident or common center line as do the openings 24, 26.

Figure 1:
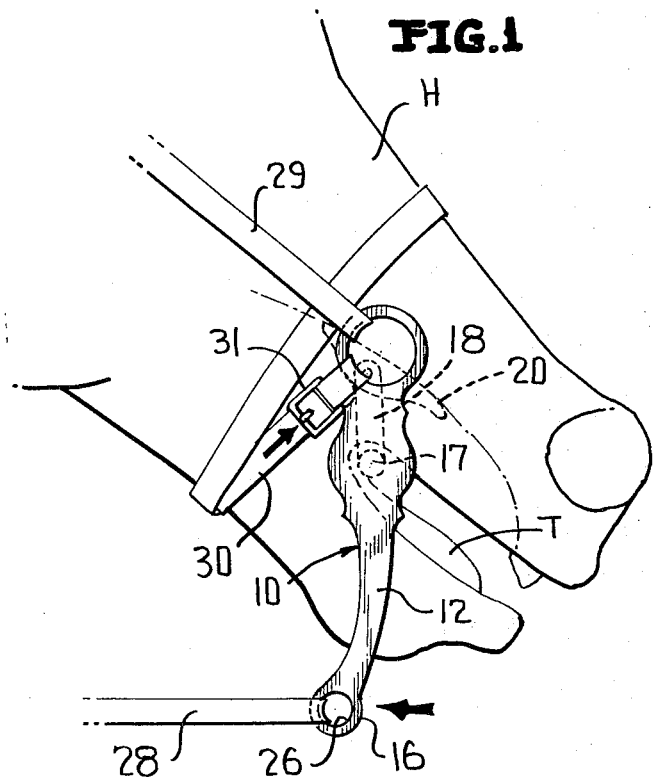
FIG. 1 is a side elevational view of the novel bridle of this invention, and illustrates the manner in which the same is applied to an animal, particularly the manner in which a strap encircles the animal's head in the area of his nose, mouth and cheeks.

A strap 30 has a buckle 31 at both ends (unnumbered) of the strap 30, and the strap is of sufficient length to enwrap an animal's head H in the manner readily apparent from FIG. 1. In the position best illustrated in FIGS. 1 and 3 the bit 17 is atop the animal's tongue T with the surface 21 engaging the roof R of the animal's mouth (unnumbered). Reins 28 have ends suitably connected to the cheek plates 11, 12 through the openings 24, 26 while straps 29 forming portions of the usual headstall are suitably connected to the cheek plates 11, 12 by means of the openings 23, 25. When it is desired to curb, stop or otherwise control the animal a pull on the reins 28 or either one thereof, as indicated by the unnumbered headed arrow in FIG. 1, results in a clockwise pivoting of the bridle 10, as viewed in the same Figure, with the bit 17 being generally the pivot point. This pivoting movement is in effect translated to a pull imparted to the ends of the strap 30, in the manner indicated by the unnumbered headed arrow associated therewith. As a result the strap 30 is drawn tightly but equally all around the lower portion of the animal's head resulting in rapid response and hence safe control. The positive action thus far described in tightening the strap 30 is augmented by the pivoting of the plate 20 and the manner in which the surface 21 lies approximately along the coincident axis of the openings 23, 25. These factors also permit the rapid return of the bridle to the unchecked position upon release of the force applied thereto through the reins 28.

Figure 4:
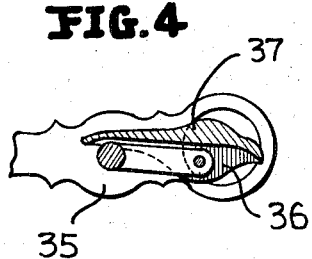
FIGS. 4 and 5 are cross-sectional views of other bridles constructed in accordance with this invention, and illustrate the manner in which mouth roof engaging plates thereof may be contoured to accommodate physiological variations in the roof contour of different animal mouths.
Figure 5:
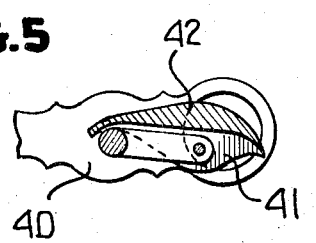
Figure 6:
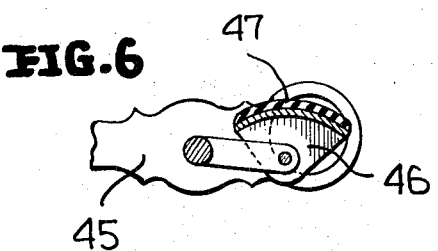
FIG. 6 is a view of another bridle similar to FIGS. 4 and 5, and illustrates the manner in which the mouth roof engaging plate thereof may carry plastic or similar resilient material for protective purposes.

FIGS. 4, 5 and 6 disclose bridles 35, 40 and 45 which are identical to the bridle 10 except for the construction of respective plates 36, 41 and 46 having respective mouth roof engaging surfaces 37, 42 and 47, the latter of which is a layer of plastic or similar resilient material which serves as additional protection for the animal's mouth. Due to differences in physiological make-up of different animals' mouths anyone or a variety of differently contoured plates, such as the plates 36, 41 and 46 can be employed without a change in the basic over-all design of the bridle.

While preferred forms and arrangement of parts have been shown in illustrating the invention, it is to be clearly understood that various changes in details and arrangement of parts may be made without departing from the scope and spirit of this disclosure.

I claim:

1. An animal bridle comprising a pair of spaced cheek pieces joined intermediate opposite ends thereof by a bit, a bar carried by said bit, a mouth roof engaging plate carried by said bar, and a strap attached to said cheek pieces whereby the strap will tighten equally around an animal's nose and chin when the bridle is rotated by reining in.

2. The animal bridle as defined in claim 1 wherein each cheek piece has an opening in one of its ends, and a mouth roof engaging surface of said mouth roof engaging plate lies on a coincident axis of said openings.

3. The animal bridle as defined in claim 1 including means pivotally mounting said mouth roof engaging plate upon said bar.

4. The animal bridle as defined in claim 1 wherein said mouth roof engaging plate has a resilient mouth roof engaging surface.

5. The animal bridle as defined in claim 2 including means pivotally mounting said mouth roof engaging plate upon said bar.

* * * * *